(12) United States Patent
Ohkubo et al.

(10) Patent No.: US 11,820,394 B2
(45) Date of Patent: Nov. 21, 2023

(54) DEVICE CONTROL APPARATUS, AND CONTROL METHOD FOR CONTROLLING DEVICES

(71) Applicants: Nissan Motor Co., Ltd., Kanagawa (JP); RENAULT S.A.S., Boulogne-Billancourt (FR)

(72) Inventors: Shota Ohkubo, Kanagawa (JP); Hirofumi Inoue, Kanagawa (JP); Jo Nishiyama, Kanagawa (JP); Takehito Teraguchi, Kanagawa (JP); Yu Shikoda, Kanagawa (JP)

(73) Assignee: Nissan Motor Co., Ltd., Kanagawa (JP)

( * ) Notice: Subject to any disclaimer, the term of this patent is extended or adjusted under 35 U.S.C. 154(b) by 498 days.

(21) Appl. No.: 17/048,901

(22) PCT Filed: Apr. 20, 2018

(86) PCT No.: PCT/IB2018/000566
§ 371 (c)(1),
(2) Date: Oct. 19, 2020

(87) PCT Pub. No.: WO2019/202351
PCT Pub. Date: Oct. 24, 2019

(65) Prior Publication Data
US 2021/0163032 A1    Jun. 3, 2021

(51) Int. Cl.
*B60W 50/10*    (2012.01)
*B60W 50/14*    (2020.01)
(Continued)

(52) U.S. Cl.
CPC ............ *B60W 50/10* (2013.01); *B60W 50/14* (2013.01); *G10L 15/22* (2013.01); *G10L 17/22* (2013.01);
(Continued)

(58) Field of Classification Search
USPC .................. 704/246, 247, 251, 252, 275
See application file for complete search history.

(56) References Cited

U.S. PATENT DOCUMENTS 7,457,755 B2 * 11/2008 Konig ................ B60R 16/0373
704/E15.045
2004/0192404 A1 * 9/2004 Zenios ................ H04M 1/6091
455/74
(Continued)

FOREIGN PATENT DOCUMENTS

CN    107901915 A    4/2018
EP    0893308 A2    1/1999
(Continued)

OTHER PUBLICATIONS

International Search Report issued in PCT/IB2018/000566 dated Sep. 4, 2019 (5 pages).
(Continued)

*Primary Examiner* — Leonard Saint-Cyr
(74) *Attorney, Agent, or Firm* — Osha Bergman Watanabe & Burton LLP

(57) ABSTRACT

A device control apparatus includes a detector which detects sound; and a controller which controls a plurality of devices. The plurality of devices includes a first device which is not related to operation of a vehicle and a second device which is related to the operation of the vehicle. The controller is configured to: recognize voice of a user by using data of the sound detected by the detector; identify a type of an operation target device from a plurality of the devices and operation content of the operation target device, based on the voice recognized; notify a user of start of activating the first device by the operation content identified and activate the first device by the operation content identified when the operation target identified is the first device; and notify the user to request a response before the controller activates the second device by the operation content identified when the operation target identified is the second device.

13 Claims, 3 Drawing Sheets

(51) Int. Cl.
 G10L 15/22  (2006.01)
 G10L 17/22  (2013.01)
(52) U.S. Cl.
 CPC ... *B60W 2540/21* (2020.02); *B60W 2540/215* (2020.02)

(56) References Cited

U.S. PATENT DOCUMENTS

2014/0354402 A1* 12/2014 Joao ............... G07C 9/00571
                                                    340/5.52
2018/0174581 A1*  6/2018 Wang ................. G10L 13/02
2019/0049942 A1*  2/2019 Dusane ............... B60R 25/25

FOREIGN PATENT DOCUMENTS

| JP | S59-117610 A  |  7/1984 |
| JP | S62-93706 A   |  4/1987 |
| JP | 2003-271193 A |  9/2003 |
| JP | 2004-198832 A |  7/2004 |
| JP | 2009-251019 A | 10/2009 |
| JP | 2012-059107 A |  3/2012 |
| JP | 2016-218361 A | 12/2016 |

OTHER PUBLICATIONS

International Preliminary Report on Patentability from PCT/IB2018/000566 dated Mar. 25, 2019 (11 pages).

* cited by examiner

DEVICE CONTROL APPARATUS, AND CONTROL METHOD FOR CONTROLLING DEVICES

TECHNICAL FIELD

The present invention relates to device control apparatus and control methods for device.

BACKGROUND OF THE INVENTION

Conventionally known, the voice recognition result notification method of the onboard electronic device recognizes the voice emitted by the user by the voice recognition means, and outputs a synthetic voice as a message from the speaker in accordance with the recognition result, when receiving the notification instruction again from the user, and outputs the synthetic voice from the speaker again performs notification. Then, when a predetermined time that can accept the re-notification instruction has elapsed, a predetermined process is performed based on the recognition result (e.g., Patent Document 1).

CITATION LIST

Patent Document

[Patent Document 1] JP 2003-271193A

SUMMARY OF THE INVENTION

Problem to be Solved by the Invention

However, in the above notification method, there is a problem that it takes a lot of time until the device executes a predetermined process after the user utters a voice.

The problem to be solved by the invention is to provide a device control apparatus and a control method for controlling device which can shorten the time from when the user speaks to when the device operates.

Means for Solving Problem

The present invention recognizes the voice of the user and identifies the type of the operation target device to be operated from among the plurality of devices and the operation content of the operation target device based on the recognized voice and controls timing of activating the operation target device with identified operation content according to the type of identified operation target, thereby, the above problems can be solved.

Effect of the Invention

The present invention can shorten the time from when the user speaks to when the device operates.

MODE(S) FOR CARRYING OUT THE INVENTION

Hereinafter, embodiments of the present invention will be described with reference to the drawings.

First Embodiment

Figure 1:
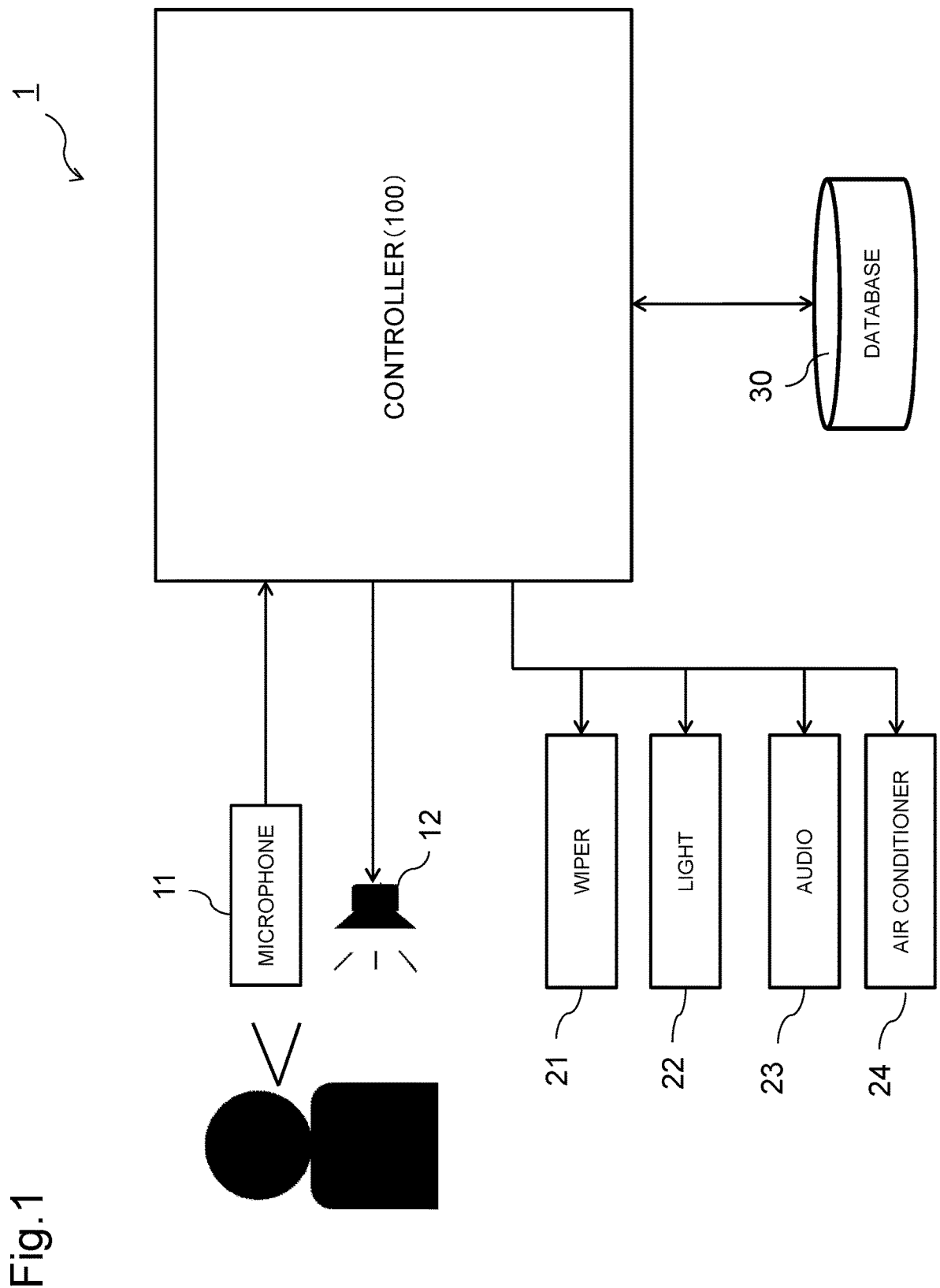
FIG. 1 is a block diagram of a device control apparatus.

FIG. 1 is a block diagram of a device control apparatus 1 according to the present invention. Device control apparatus 1 includes a microphone 11, a speaker 12, a wiper 21, a light 22, an audio 23, an air conditioner 24, a data base 30, and a controller 100. Device control apparatus 1 of the present embodiment is a control device to be mounted on a vehicle, recognizes the voice of the user based on the voice, and controls a plurality of on-board devices.

The microphone 11 converts the voice emitted by the user into an electrical signal and outputs it to the controller 100. The microphone 11 corresponds to a detector that detects sound in the cabin, including the user's voice. Speaker 12 is a device for converting the audio signal output from the controller 100 into sound and emitting a sound toward the user in the vehicle cabin. The voice recognition system includes a microphone 11, a speaker 12, a database 30, and a controller 100. The voice recognition system utilizes known voice recognition techniques to identify information representing a user's intention from sounds detected by microphone 11. The voice recognition system, in response to identified information, emits a sound from the speaker 12. Thus, the voice recognition system realizes the dialogue between the user and the controller 100.

The wiper 21 is a device for removing dirt on the surface of the windshield. The light 22 is a lighting apparatus for illuminating the exterior of the vehicle. The audio is a device including a radio and a reproduction device, a device for playing music in the vehicle cabin. The air conditioner 24 is an apparatus for adjusting the air conditioning (temperature, etc.) in the vehicle interior. The wiper 21 and the light 22 are device related to driving (hereinafter referred to as driving-related device). The driving-related device is device that affects the behavior of the vehicle and/or the driving operation of the user when the vehicle is driven by user operation or automatic driving. Incidentally, the driving-related device is not limited to the wiper 21 and the light 22, for example, a handle, a winker.

The audio 23 and the air conditioner 24 is device not related to driving (hereinafter, also referred to as non-driving-related device). Non-driving-related device is not limited to the audio 23 and the air conditioner 24, may be, for example, a reading light.

The database 30 is a recording medium, such as data required for voice recognition and data necessary for operation of the onboard device are recorded. Data necessary for voice recognition includes data of acoustic models necessary to distinguish words such as "a", "i" when it is Japanese. Also, algorithms are stored in the data required for voice recognition to emphasize the similarity between the recognized voice signal and a specific sequence. In addition, data for identifying device to be operated (hereinafter, also referred to as device identification data) and data for identifying the operation of certain device (also referred to as operation identification data) are recorded in the database. For example, the identification data for identifying the air conditioner 24 includes data of the name "e-a-ko-n" and data of the name "re-i-bo" (both are Japanese name of air conditioner). Operation identification data is stored in a database after distinguishing which of two types, at least, driving-related device and non-driving-related device, corresponds to. For example, when the operation identification data is an air conditioner, it falls into the type of non-driving-related device.

The operation identification data is data representing various operations of the device, classified for each device, and stored in the database 30. For example, when the device is an air conditioner 24, the operation identification data indicates the name of the operation required to operate the air conditioner 24, the number, and a term indicating the temperature adjustment. For example, when the user utter a voice to activate the air conditioner, it is anticipated that the user will utter terms such as "on", "off", "intensify", "weaken", "dry mode", "25° C.". The operation identification data includes such language data on the operation. A plurality of operation identification data relating to the air conditioner 24 is associated with the device identification data of the air conditioner 24 and is recorded in the database 30.

The database 30 also stores the data of the recognition result by the voice recognition system. For example, when the user performs a dialogue with the controller 100, the data recognized from the voice of the user is recorded in the database 30. The voice data of the user recorded in the database 30 is analyzed and the keyword used for the above-described voice recognition process is updated so that the accuracy of the voice recognition is improved.

The controller 100 controls devices such as wipers 21, lights, 22, audio 23 and air conditioner 24, and voice recognition systems. The controller 100 has a ROM, a CPU. The ROM has the program for controlling such devices and systems. The CPU is a unit for executing the program recorded in the ROM. The controller 100 is a control body for executing the control method of the apparatus of the present embodiment.

Figure 2:
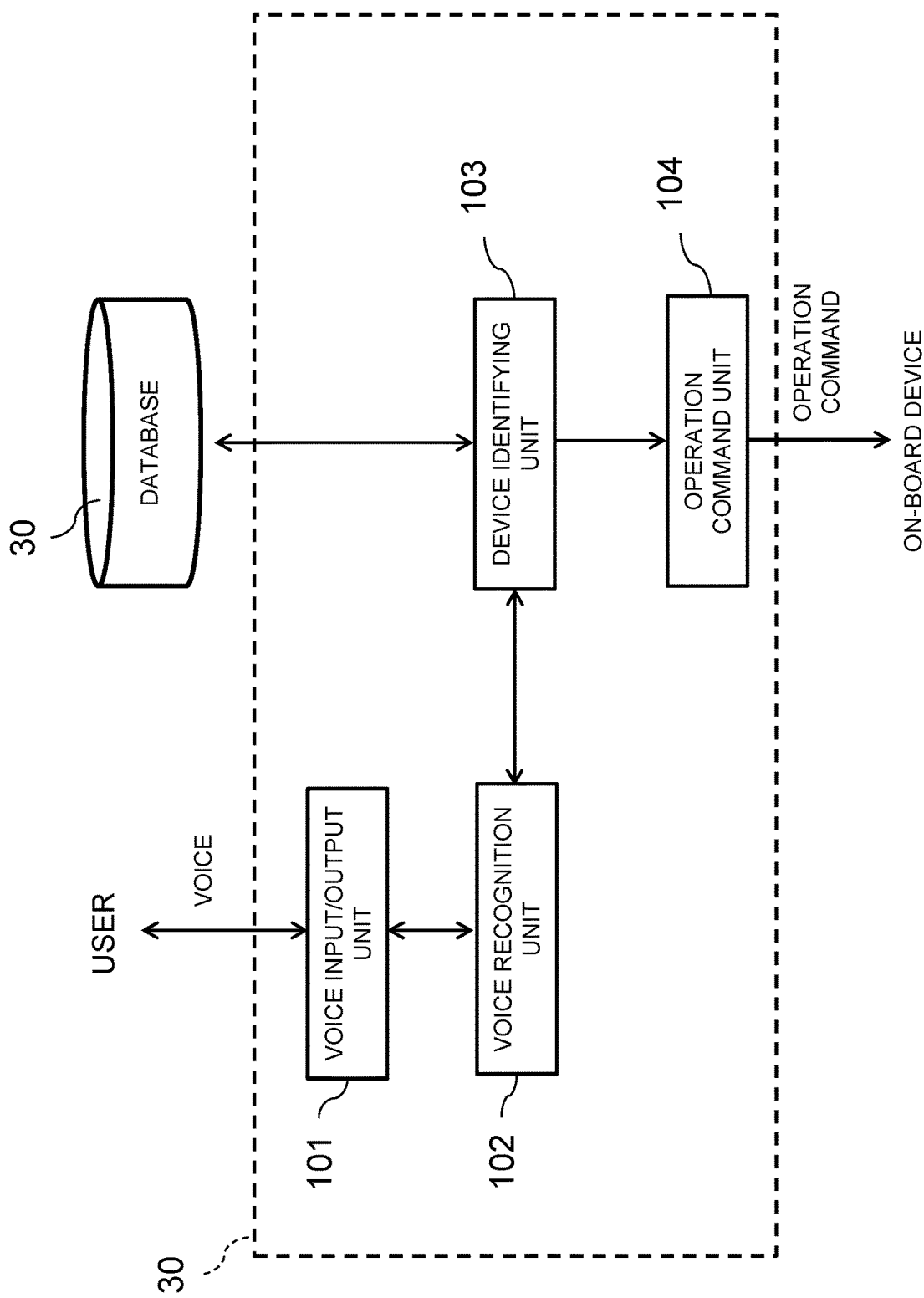
FIG. 2 is a block diagram of the controller shown in FIG. 1.

Next, with reference to FIG. 2, the function of the controller 100. FIG. 2 is a block diagram of the controller 100. The controller 100 includes a voice input/output unit 101, a voice recognition unit 102, a device identifying unit 103, and an operation command unit 104 as a functional block for controlling devices using a voice recognition system.

The voice input/output unit 101 uses the microphone 11 to acquire the voice data of the voice uttered by the user and transmits the voice data to the voice recognition unit 102 at a predetermined cycle. The voice input/output unit 101 uses the speaker 12 to output the data of the sound generated by the voice recognition unit 102 to the user. The voice input/output unit 101 waits in a state in which the voice from the user can be acquired during operation of an apparatus such as an air conditioner 24. In addition, the voice input/output unit 101 waits in a state in which the voice from the user can be acquired even during a dialogue. The dialogue is between the user and the controller 100 utilizing a voice recognition system.

The voice recognition unit 102 analyzes the user's voice data acquired by the voice input/output unit 101 and converts the voice generated by the user into character string information. For example, when the user utters "e-a-ko-n", the voice recognition unit 102 recognizes the voice by a string of "E", "A", "K O", and "N" using a natural language processing technology. Incidentally, the conversion process from the voice data to the string is affected by the noise from the outside. For example, even when the user utters "e-a-ko-n", the voice recognition unit 102 may recognize incorrectly some of the letters like "E", "WA", "K O", and "N". Such an error in voice recognition affects the value of accuracy, which will be described later. The voice recognition unit 102 recognizes the user's voice using an acoustic model and algorithm stored in the database. Then, the voice recognition unit 102 outputs the recognition result to the device identifying unit 103. The voice recognition unit 102 records the data of the recognized voice in the database 30.

The voice recognition unit 102, when it is performing a dialogue between the user and the controller 100, identifies a command corresponding to the character string from a character string recognized by the voice recognition and may output the response by voice data according to the command. For example, when the user issues "kyou no tenki ha? (it means "How is the weather today?" in English)", the voice recognition unit 102 analyzes the user's voice data to generate a string in the order of "kyo", "u", "no", "te", "n", "ki", and "ha". By connecting the strings, the voice recognition unit 102 can grasp the user's intention. Then, the voice recognition unit 102 generates the data of the sound that matches the grasped user's intention and outputs the data of the sound to the voice input/output unit 101. In the above example, since the recognition unit 102 can recognize that the user asks the weather today, the voice recognition unit 102 outputs data of the sound such as "It is sunny today.". Thus, the dialogue between the user and the controller 100 is realized.

Voice recognition unit 102 specifies which classification the utterance from the user corresponds to among the utterance of the operation request, the user response wait, and the dialogue cancellation request. The operation request indicates that the user is requesting operation of the device. The user response wait indicates a state in which the voice recognition unit is waiting for a response from the user. The dialogue cancellation request indicates that the user is requesting to cancel the dialogue with the system.

When the utterance from the user corresponds to the utterance of the operation request, the voice recognition unit 102 outputs the data of the character string specified by the voice recognition to the device specific unit 103.

When the utterance from the user corresponds to the user response wait, the voice recognition unit 102 maintains a waiting state for the user's response for a predetermined period. In the present embodiment, when the wiper operation is specified based on the voice of the user, the voice recognition unit 102 performs confirmation with the user before operating the wiper because the wiper affects the driving operation of the user. In such a case, the voice recognition unit 102 is in a state of waiting for a user response. The voice recognition unit 102 may notify the user of the recognition result of the voice in the state of waiting for the user response. For example, when the wiper operation is identified based on the user's voice, the voice recognition unit 102 may output a voice such as "Would you like to operate the wiper?" to the user from the speaker 12. By outputting such a voice, it is possible to confirm the correctness of the recognition result to the user.

When the utterance from the user corresponds to a dialogue cancellation request, the dialogue between the user and the controller 100 is cancelled. For example, when the user utters a "Stop the voice recognition system." and the voice recognition unit 102 can recognize the user's intention, the dialogue is cancelled.

Device identifying unit 103 identifies the operation target device and the operation contents intended by the user based on the recognition result of the voice by the voice recognition unit 102. Device identifying unit 103 refers to the data of the string (corresponding to the voice of the user) indicated by the recognition result and the device identification data recorded in the database 30 and identifies a name matching or similar to the name indicated by the string from the name of the device stored in the database.

Device identifying unit 103 refers to the data of the string (corresponding to the voice of the user) indicated by the recognition result and the operation identification data recorded in the database 30 from among the names of the operation contents stored in the database and identifies a name matching or similar to the name indicated by the string.

The device identifying unit 103, when identifying the operation target device and the operation contents, calculates the value of the accuracy of them. The accuracy of the operation target device shows the similarity between voice data recognized from voice data and device identification data. The accuracy of operation contents shows similarity (similarity of character strings) between voice data recognized from voice data and operation identification data. The higher the value of the accuracy, the more likely it is that the device which the user wants to operate and the device identified in voice recognition correspond. The higher the value of the accuracy, the more likely it is that the operation which the user wants and the operation identified in voice recognition correspond. In other words, the accuracy of the operation target device and the accuracy of the operation contents indicate the accuracy of the recognition result in the voice recognition system.

The value of the accuracy is represented by, for example, a value from 0 to 1. When a plurality of devices can be identified from the voice data, the device identifying section 103 calculates the value of the accuracy for each identified device. When a plurality of operation contents can be identified from the voice data, the device identifying section 103 calculates the value of the accuracy for each identified operation content.

The device identifying unit 103 compares the calculated value of accuracy and the threshold value of accuracy. When the calculated value of accuracy is higher than the threshold value of accuracy, the device corresponding to the calculated accuracy is identified as the operation target device. The threshold value of accuracy is set in advance. Thus, the device identifying unit 103 identifies the operation target device based on the recognized voice. The device identification data are classified into driving-related device and non-driving-related device in the database 30. Therefore, when the operation target device is identified, the classification of the operation target device is also specified.

The device identifying unit 103, similarly for the operation contents, compares the calculated value of accuracy and the threshold value. When the calculated value of accuracy is higher than the threshold value of accuracy, the operation content corresponding to the calculated accuracy is specified as the operation content of the operation target device. Thus, the device identifying unit 103 identifies the operation contents of the operation target device based on the recognized voice.

The device identifying unit 103 transmits the information of identified operation device object, information of identified operation content, and a signal including information of accuracy to the operation command unit 104, also records their information in the database 30. When the controller 100 operates the device by the dialogue between the user and the controller 100, the information of the operation target device, the operation contents, and the accuracy are held in the database 30 during the dialogue. The device identifying unit 103, when the dialogue ends, or when the operation of the operation target device ends, resets the information held in the database.

The device identifying unit 103 compares the calculated value of accuracy and the threshold value of accuracy. When the calculated value of accuracy is equal to or less than the threshold value of accuracy, device identifying unit 103 outputs a signal for requesting re-uttering to the user to the voice recognition unit 102. The device identifying unit 103, when it is impossible to identify the operation target device, outputs a signal of the re-uttering request to the device identifying unit 103 in order to tell the name of the device to the user. Further, the device identifying unit 103, when it is not possible to identify the operation contents, outputs a signal of the re-uttering request to the device identifying unit 103 in order to tell the operation contents in words to the user. Further, the device identifying unit 103, when it is impossible to calculate the value of the accuracy from the voice data recognized by the voice recognition, outputs a signal for requesting a re-utterance to the user to the voice recognition unit 102.

The operation command unit 104 controls the operation target device based on the information of the operation target device and the operation contents. The operation command unit 104 controls the timing to activate the target device in the operation content depending on the type of the target device.

The value of the accuracy of voice recognition by the voice recognition system may be lowered by the voice quality of the user and the sound in the cabin, etc. Therefore, when the device is activated by the user's voice, it is also conceivable to confirm the user's intention by using the dialogue between the user and the system prior to starting operation for all device operations. However, in the case of confirming the intention of the user for the operation of all devices, since it takes time for the dialogue by voice recognition, the time from the user's voice to the operation of the device increase.

In the present embodiment, the controller 100 classifies the type of a plurality of devices a device requiring or not requiring a response from the user to control the operation timing. In other words, when the device requires a response from the user, the controller 100 notifies the user to confirm whether or not the device should be operated, and when the controller confirms that the user wants the device is operated, the controller 100 turns the device activate. Notification to the user is made by a dialogue between the user and the controller 100. In addition, when the device does not require a response from the user, the controller 100 does not notify the user to confirm whether or not the device should be operated, and activate the device. When the operation target device is a device that does not require a response from the user, the controller 100 may notify the user that the operation of the device starts to activate the device without waiting for a response from the user.

As described above, the types of multiple devices are divided into driving-related device and non-driving-related device. The operation command unit 104, when the operation target device is a driving-related device, performs dialogue with the user prior to operating in identified operation content. When the operation target device is a non-driving related device, the operation command unit 104 controls the operation timing in accordance with the accuracy of the voice recognition result. In other words, when the value of the accuracy is equal to or greater than the threshold value, the operation command unit 104 does not check the operation to the user and activate the operation target device in identified operation content. When the value of the accuracy is less than the threshold value, the operation command unit 104 performs operation check with the user prior to activate the operation target device with identified operation details. Then, the operation command unit 104 transmits a command value indicating identified operation content to the operation target device.

Figure 3:
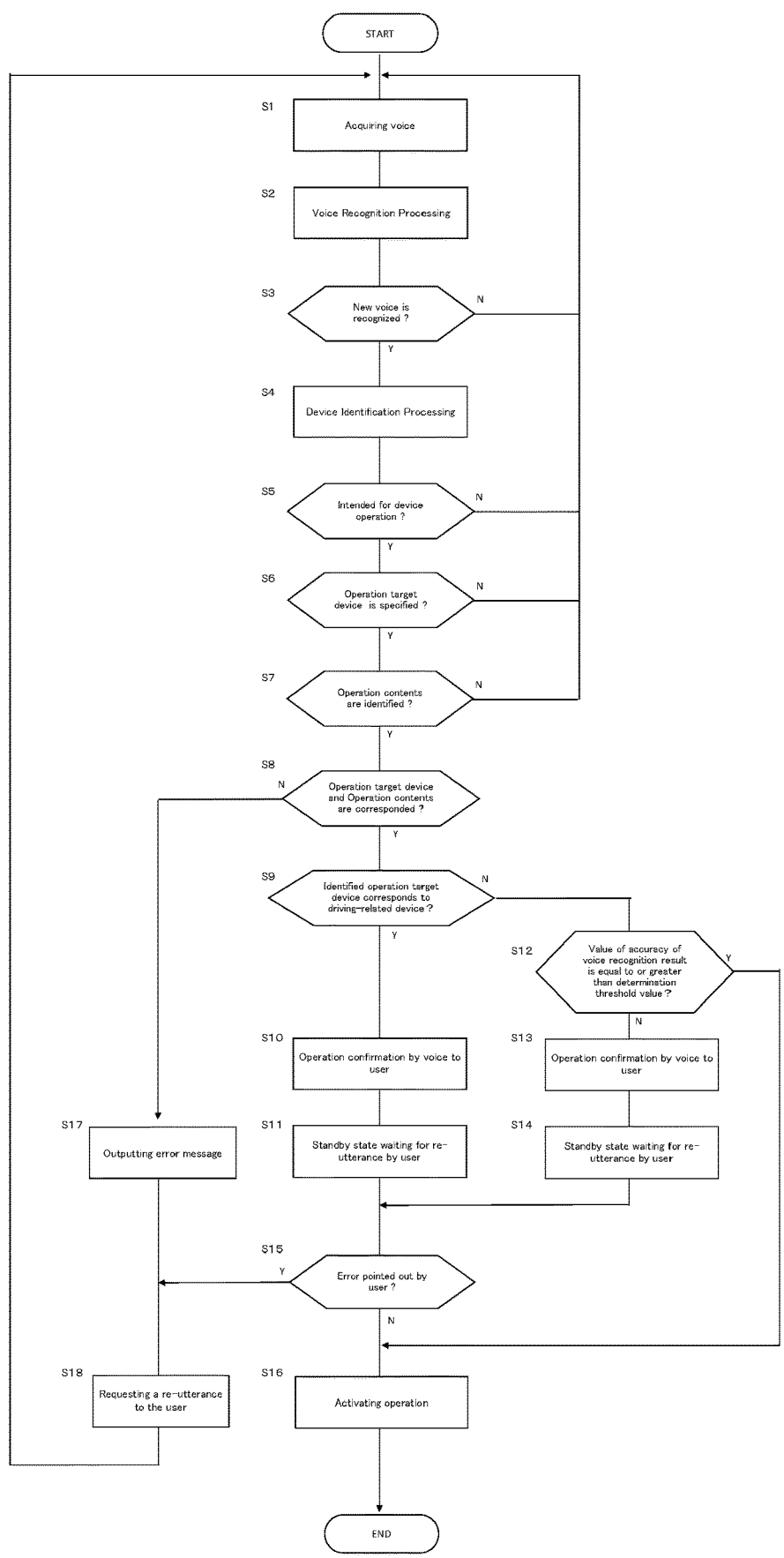
FIG. 3 is a flowchart showing a control flow of the controller shown in FIG. 1.

Next, with reference to FIG. 3, a control flow of the controller 100. FIG. 3 is a flowchart showing a control flow of the controller 100. The control flow illustrated in FIG. 3 is repeatedly executed at a predetermined cycle.

In step S1, the controller 100 uses a microphone 11 to acquire the voice of the user. In step S2, the controller 100 executes a voice recognition processing. The voice recognition processing is processed by a voice recognition system for recognizing the voice of a user using the voice data output from the microphone 11. The controller 100 stores the voice data recognized in the database 30. That is, the controller 100 executes the storage control for storing the data indicating the recognition result of the voice in the database 30 and the voice recognition control in parallel. Thus, it is possible to increase the accuracy of voice recognition since the past recognition results can be utilized in voice recognition processing.

In step S3, the controller 100 determines whether or not a new voice is recognized from the result of the voice recognition processing. The new voice is a voice for initiating a dialogue between the user and the controller 100. When it is determined that a new voice is recognized, the controller 100 makes it possible to interact with the user. For example, when the voice recognition system has a noise canceling function in order to increase the voice recognition accuracy, the controller 100 keeps the noise canceling function operating. The controller 100 executes the control flow of step S1 when it is determined that the new voice is not recognized. The control loop in steps S1 to S3 is repeatedly executed so that a state waiting for an utterance from the user is maintained.

In step S4, the controller 100 starts the device identification processing for identifying the operation target device and the operation contents based on the voice recognized. In step S5, the controller 100 determines whether or not the user is intended for device operation. For example, when a character string recognized by voice recognition does not fall under the name indicated by the device identification data, the controller 100 determines that the user is not intended for device operation and executes the control flow of step S1. The controller 100 also calculates the value of the accuracy for the identified voice.

When it is determined that the user is intended for device operation is intended, in step S6, the controller 100 compares the calculated value of the accuracy with the accuracy threshold value, and determines whether or not the operation target device can be specified based on the comparison result. When it is impossible to identify the operation target device, the controller 100 executes the control flow of step S1. At this time the controller 100 may output a voice from the speaker 12 for telling that the operation target device could not be identified and for requesting the user to re-utterance.

When it is determined that the operation target device can be identified, in step S7, the controller 100 compares the calculated value of the accuracy with the accuracy threshold value, and determines whether or not the operation contents corresponding to the operation target device can be identified. When the operation contents cannot be identified, the controller 100 executes the control flow of step S1. At this time, the controller 100 may output a voice from the speaker 12 for telling that the operation contents could not be identified and may for requesting the user to re-utterance.

As described above, when it is impossible to identify at least one of the operation target device and the operation contents based on the voice recognized, the controller 100 requests a re-utterance to the user. This allows the user to quickly understand what to do to operate the device.

In step S8, the controller 100 determines whether the operation target device and the operation contents correspond. When the operation target device and the operation content do not correspond to each other, the controller 100 executes the control flow of step S17.

When the operation target device and the operation contents correspond, in step S9, the controller 100 determines whether or not the type of identified operation target device corresponds to the driving-related device. When the operation target device corresponds to a driving-related device, in Step S10, the controller 100 performs a notification (hereinafter, referred to as the operation confirmation) by voice to the user to confirm whether or not the user is intended to activate the operation target device. For example, when the wiper is identified as an operation target device, the controller 100 outputs a sound such as "Do you operate the wiper?" from the speaker 12.

In step S11, the controller 100 holds a standby state waiting for a re-utterance by the user. When the controller 100 confirms the response to activate the device from the user while waiting for a re-utterance, it activates the device in the control flow of step S16, which will be described later.

In the control flow of step S9, when it is determined that the type of identified operation target device does not fall under the driving-related device (that is, when it is determined that the type of identified operation target device falls under the non-driving-related device), the controller 100 determines whether the value of the accuracy of the voice recognition result is equal to or greater than the determination threshold value.

When the value of the accuracy of the voice recognition result is less than the determination threshold value, the controller 100 performs an operation check by voice to the user in step S13. In step S14, the controller 100 holds a standby state waiting for a re-utterance by the user. When the controller 100 confirms the response to activate the device from the user while waiting for a re-utterance, it activates the device in the control flow of step S16, which will be described later.

In step S15, the controller 100 determines whether or not recognized voice indicating an error within a predetermined period from the time of starting the standby state by the control processing in step S11 or step S14. When the voice indicating an error within a predetermined period is recognized by the voice recognition processing, the controller 100 executes the control processing of step S18. When the voice indicating the error is not recognized within a predetermined time, the controller 100 executes the control flow of step S16.

When it is determined that the value of the accuracy of the voice recognition result is equal to or more than the determination threshold value in the control flow of step S12, the controller 100 executes the control flow of step S16 without performing operation confirmation by voice such as the control flow of step S10 or step S13. Note that, in steps from S12 to S16, a notification of start of activating the identified operation target device may be performed before activating the identified operation target device. For example, when the operation target device is an "air conditioner" and the operation content is "21° C.", the notification content in this case is a notification that "set the air conditioner to 21° C.". In other words, when the identified operation target device is a non-driving-related device and the value of the accuracy of the voice recognition result is equal to or greater than the threshold value, no notification is given to the user to confirm to activate the device, but a one-way notification to tell starting the operation of the operation target device may be given.

In step S16, the controller 100 activates identified operation target device by identified operation content. When identified operation device object is a driving-related device, the controller 100 performs an operation check in the control flow of step S10. When the controller confirms a response to activate the device from the user in the control flow of step S11 and step S15, the controller 100 activates the operation target device. When identified operation device target is a non-driving-related device and the value of the accuracy of the voice recognition result is less than the threshold, the operation is confirmed in the control flow of step S13. When the response to activate the device from the user in the control flow of steps S14 and S15, the controller 100 activates the operation-target device. The controller 100 may perform operation check again when it is impossible to confirm the response from the user within a predetermined period after the operation check in the control flow of step S10 or step S13. The controller 100 may notify the user that the voice recognition processing ceases without operating the device when it is impossible to confirm the response from the user within a predetermined period after performing the operation check in the control flow of step S10 or step S13.

When it is determined that the operation target device and the operation contents do not correspond in the control flow of step S8, the controller 100 outputs an error message from the speaker 12 in step S17. An error message indicates that the operation details cannot be identified or that the operation target device cannot be identified. In step S18, the controller 100 outputs a voice from the speaker 12 for requesting a re-utterance to the user and executes the control processing of step S1.

In the above-described embodiment, each hardware described in FIG. 1 is exemplified as a device mounted on a vehicle, but a part of the hardware described in FIG. 1 or a part of the function of the controller 100 described in FIG. 2 may be realized by a part of a server connected by a network. For example, the voice recognition unit 102 may be provided in a server connected by a network, and the voice data from the voice input/output unit 101 provided in the vehicle may be received to transmit the result recognized by the voice to the vehicle. Further, a portion of the hardware described in FIG. 1 or a portion of the function of the controller 100 described in FIG. 2 may be realized by a mobile terminal connected by a network. For example, a mobile device having a voice input unit 101 and a voice recognition unit 102 may perform voice recognition of the user's utterance and interactions with the user and may be configured to transmit the results recognized by the voice to the vehicle.

As described above, in the present embodiment, the device control apparatus recognizes the voice using the sound data detected by the detector, identifies the type of the operation target device to be operated from among the plurality of devices and the operation contents of the operation target device based on the recognized voice, and controls the timing to activate the operation target device by the operation contents according to the type of identified operation target device. Thus, it is possible to accelerate the operation timing according to the type of device. As a result, the time from the user speaking to the time operating the device can be shortened.

In the present embodiment, when identified operation target is the first device, the first device is operated by identified operation content, and when identified operation target is the second device (the electronic component that differs in type from the first device), a notification is issued to the user in advance of activating the second device by identified operation content. Thus, in the case of operating a device requiring operation confirmation to the user in voice recognition, since the notification for requesting a response to the user is performed, the optimum target device transmission process and the operation execution process can be executed.

Further, in the present embodiment, the device control apparatus distinguishes the type of a plurality of devices into the non-driving-related devices (corresponding to the first device) and the driving-related devices (corresponding to the second device). Thus, whether or not the operation target device affects the behavior or driving operation of the vehicle, it is possible to select the target device transmission process and the operation execution process properly according to whether or not the operation target device affects the driving operation of the vehicle.

In this embodiment, when identified operation target is a non-driving-related device, the non-driving-related device is activated by identified operation content without notifying the user. Thus, since the transition to direct operation without performing the operation confirmation to the user, it is possible to execute the operation promptly without making the user wait.

In the present embodiment, when identified operation target is a non-driving-related-device, the non-driving-related device is activated in identified operation content without giving notification to the user to request a response. Thus, since the transition to direct operation without performing the operation confirmation to the user, it is possible to execute the operation promptly without making the user wait.

In the present embodiment, the device control apparatus stores the data of the voice, the data indicating the type of the operation target device, and the data indicating the operation contents in the database, refers to the data stored in the database, and identifies to identify the operation target device and the operation contents corresponding to the voice detected by the microphone 11 (corresponding to the detector). Thus, it is possible to increase the accuracy of voice recognition.

Further, in the present embodiment, the device control apparatus executes in parallel a voice recognition control for recognizing the voice and the device specific control for identifying the type and operation contents of the operation target device. Thus, after the utterance of the user, it is possible to promptly execute the device specific control.

In the present embodiment, the value of the accuracy indicating the recognition result of the operation target device and the operation contents is calculated. The device control apparatus can execute the optimum processing using the accuracy.

In the present embodiment, the recognition result of the user's voice is notified to the user. Thus, since the device control apparatus can check whether the recognition result is correct or not, it is possible to quickly move to the request of execution or re-utterance of the operation.

In the present embodiment, the device control apparatus performs dialogue with the user by outputting a sound using a speaker in response to the recognized voice, and stops the dialogue in accordance with the recognition result of the voice. Since the device control apparatus can grasp the intention of the user in this way, it is possible to immediately stop the dialogue.

As shown in FIG. 3, when at least one of the operation target device and the operation content cannot be specified, one of the control flow in steps S1 to S7 and the control flow in steps S1 to S8 is executed.

In a modification of the embodiment, while the control loop is repeatedly executed, when a predetermined time has elapsed in a state in which at least one of the operation target device and the operation content can not be specified, the controller 100 requests a re-utterance to the user. Thus, since the shortage of information necessary for device operation can be communicated to the user, it is possible to require the user to supplement the information.

In another modification of the present embodiment, while the control loop is repeatedly executed, when a predetermined time has elapsed in a state of the calculated value of the accuracy less than or equal to a predetermined value, it requests a re-utterance to the user. Thus, it is possible to prevent the unstable operation of the system due to insufficient accuracy, since the accuracy requires a re-utterance when it is less than the threshold value.

In another modification of the present embodiment, before the lapse of the above predetermined period, when identifying the error of the recognition result of the voice from the dialogue with the user, it requests a re-utterance to the user. Thus, it is possible to quickly shift to re-utterance without waiting for the request of re-utterance.

In another modification of the present embodiment, when identified operation target is a driving-related device, the device control apparatus activates the device that differs from the driving-related device before activating the driving-related device in the identified operation content. Controller 100 may illuminate the lamp as a device different from the driving-related device. The lamp indicates the start of operation of a particular driving-related device by flashing. Thus, the user can recognize that the operation target is a driving-related device before the driving-related device operates.

In another modification of the present embodiment, when identified operation target is a non-driving-related device, the device control apparatus activates the non-driving-related device in the predetermined operation content prior to activate of the non-driving-related device in identified operation content. As an example, when the user's request is to reduce the air volume of the air conditioner, the controller 100 repeats the operation several times to reduce the air volume of the air conditioner for a slight time of about 0.2 seconds. "Reduce the air volume" intended by the user is intended to reduce the air volume for a long time not a few seconds, but the controller reduces the air volume for a short time as an operation different from identified operation content. Thus, the user can recognize that the air conditioner is an operation object. As another example, when the user's purpose is to "set the radio to radio station AA," the device control apparatus conveys that the audio is to be operated to the user by flowing a unique sound for a small amount of time, about 0.2 seconds, from the audio. Thus, it is possible to communicate the operation target device safely and promptly to the user.

In another modification of the present embodiment, based on the recognized voice, when it is impossible to identify at least one of the operation target device and the operation contents, and outputs a sound or light from the out put device. The device control apparatus can transmit the operation target to the user by an illumination indicative of the operation of the driving-related device. Since the transmission in a short time by the alarm sound or light, it is possible to quickly re-utterance and the voice recognition. The output device may be a speaker 12.

In the control flow of step S10, the device control apparatus outputs a voice to the user but it may convey the information of the operation target device to the user by the inherent operation of the non-driving-related device 152. For example, when non-driving-related device 152 is audio, the inherent operation corresponds to an inherent sound.

EXPLANATIONS OF LETTERS OR NUMERALS

1 . . . Device control apparatus
11 . . . Microphone
12 . . . Speaker
21 . . . Wiper
22 . . . Light
23 . . . Audio
24 . . . Air conditioner
30 . . . Database
100 . . . Controller
101 . . . Voice input/output unit
102 . . . Voice recognition unit
103 . . . Device identifying unit
104 . . . Operation command unit

The invention claimed is:

1. A device control apparatus comprising:
a detector which detects sound; and
a controller which controls a plurality of devices, wherein
the plurality of devices includes a non-driving related device which is not related to operation of a vehicle and a driving related device which is related to the operation of the vehicle;
the controller is configured to:
recognize voice of a user by using data of the sound detected by the detector;
identify a type of an operation target device from a plurality of the devices and operation content of the operation target device, based on the voice recognized;
notify a user of start of activating the non-driving related device by the operation content identified and activate the non-driving related device by the operation content identified when the operation target identified is the non-driving related device; and
notify the user to request a response before the controller activates the driving related device by the operation content identified when the operation target identified is the driving related device.

2. The device control apparatus according to claim 1, wherein the controller is configured to activate a device which is different from the driving related device before the controller activates the driving related device by the operation content identified when the operation target identified is the driving related device.

3. The device control apparatus according to claim 1, wherein the controller is configured to activate the non-driving related device by a predetermined operation content before the controller activates the non-driving related device by the operation content identified when the operation target identified is the non-driving related device.

4. The device control apparatus according to claim 1, wherein the controller is configured to activate the non-driving related device by the operation content identified without notifying the user to response when the operation target identified is the non-driving related device.

5. The device control apparatus according to claim 1 includes:
 a database which stores data of the voice, data which indicates the type of the operation target device and data which indicates the operation content,
 wherein the controller is configured to:
  refer to the data stored in the database; and
  identify the operation target device and the operation content which correspond to the voice detected by the detector respectively.

6. The device control apparatus according to claim 1, wherein the controller is configured to execute a voice recognition control which recognizes the voice and a device identification control which identifies the type of the operation target device and the operation content in parallel.

7. The device control apparatus according to claim 1, wherein the controller is configured to calculate a value of the accuracy which indicates the recognition result of the operation target device and of the operation content based on the voice detected by the detector.

8. The device control apparatus according to claim 1, wherein the controller is configured to request re-utterance to the user when it is impossible to identify at least one of the operation target device and the operation content based on the voice recognized.

9. The device control apparatus according to claim 1 includes an output device which outputs sound or light, wherein the controller is configured to make the output device output sound or light when it is impossible to identify at least one of the operation target device and the operation content based on the voice recognized.

10. The device control apparatus according to claim 1 includes a speaker, wherein the controller is configured to:
 perform a dialogue with user in response to the voice recognized by outputting a sound using the speaker; and
 request re-utterance to the user when a predetermined time has elapsed in a state in which at least one of the operation target device and the operation content can not be identified based on the voice recognized.

11. The device control apparatus according to claim 10, the controller is configured to request re-utterance to the user when the error of the recognition result of the voice is identified from the dialogue before the lapse of the predetermined time.

12. The device control apparatus according to claim 1 includes a speaker, wherein the controller is configured to:
 perform a dialogue with user in response to the voice recognized by outputting a sound using the speaker; and
 request re-utterance to the user when a predetermined time has elapsed in a state in which the calculated value of the accuracy is less than a predetermined value.

13. A control method for controlling a non-driving related device which is not related to operation of a vehicle and a driving related device which is related to the operation of the vehicle by a controller, the method comprising:
 recognizing a voice of user by using data of sound detected by a detector,
 identifying a type of an operation target device to be operated from among a plurality of the devices and operation content of the operation target device, based on the voice recognized;
 notifying a user of start of activating the non-driving related device by the operation content identified and activating the non-driving related device by the operation content identified when the operation target identified is the non-driving related device; and
 notifying the user to request a response before the controller activates the driving related device by the operation content identified when the operation target identified is the driving related device.

* * * * *